Oct. 26, 1965   J. P. CREIGHTON ETAL   3,213,619
HYDROSTATIC TRANSMISSION
Filed April 22, 1964   4 Sheets-Sheet 1

JOHN P. CREIGHTON
DENNIS HARRIS
VICTOR R. SLIMM
INVENTORS

BY John R. Faulkner
Donald J. Harrington
ATTORNEYS

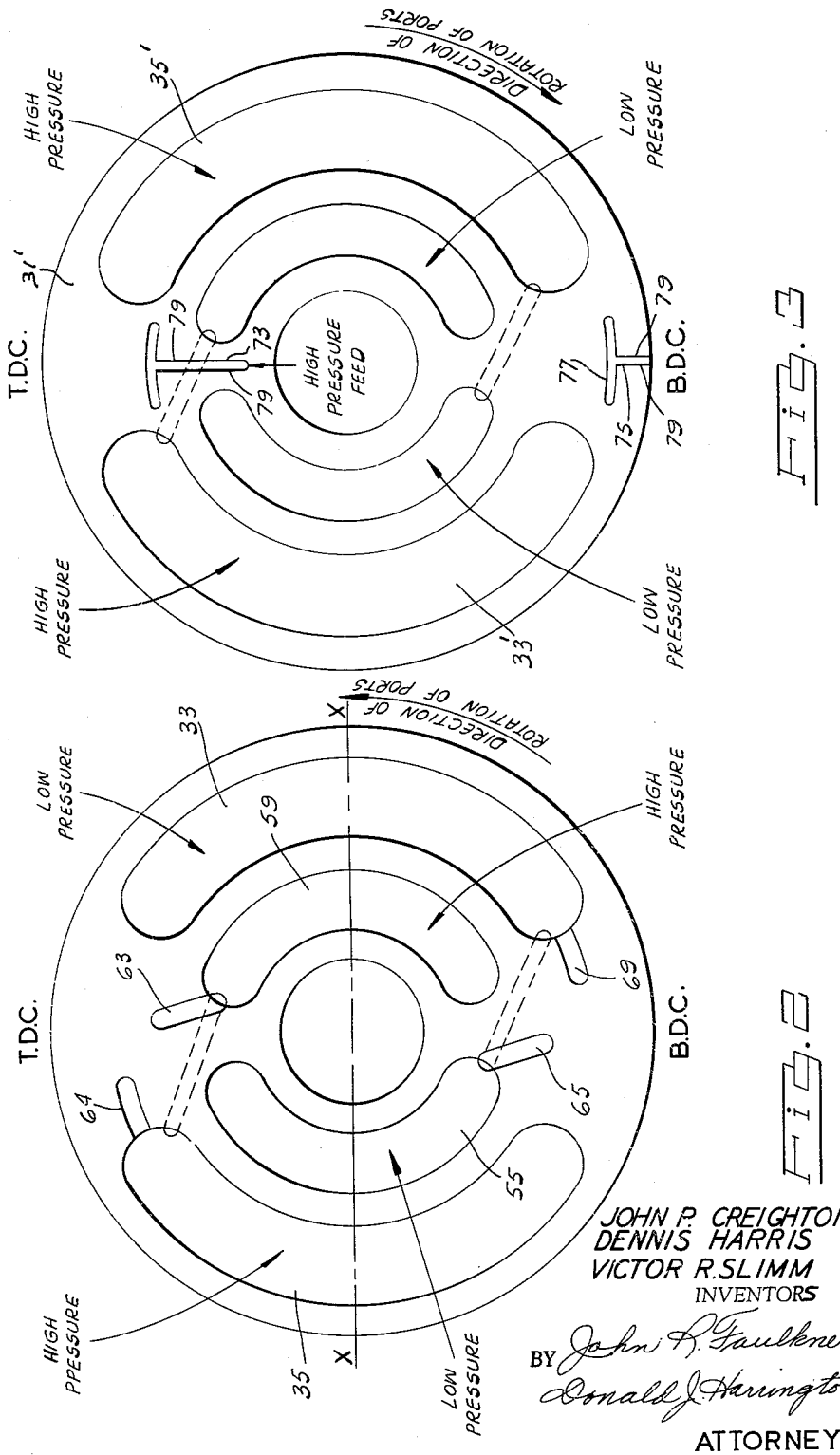

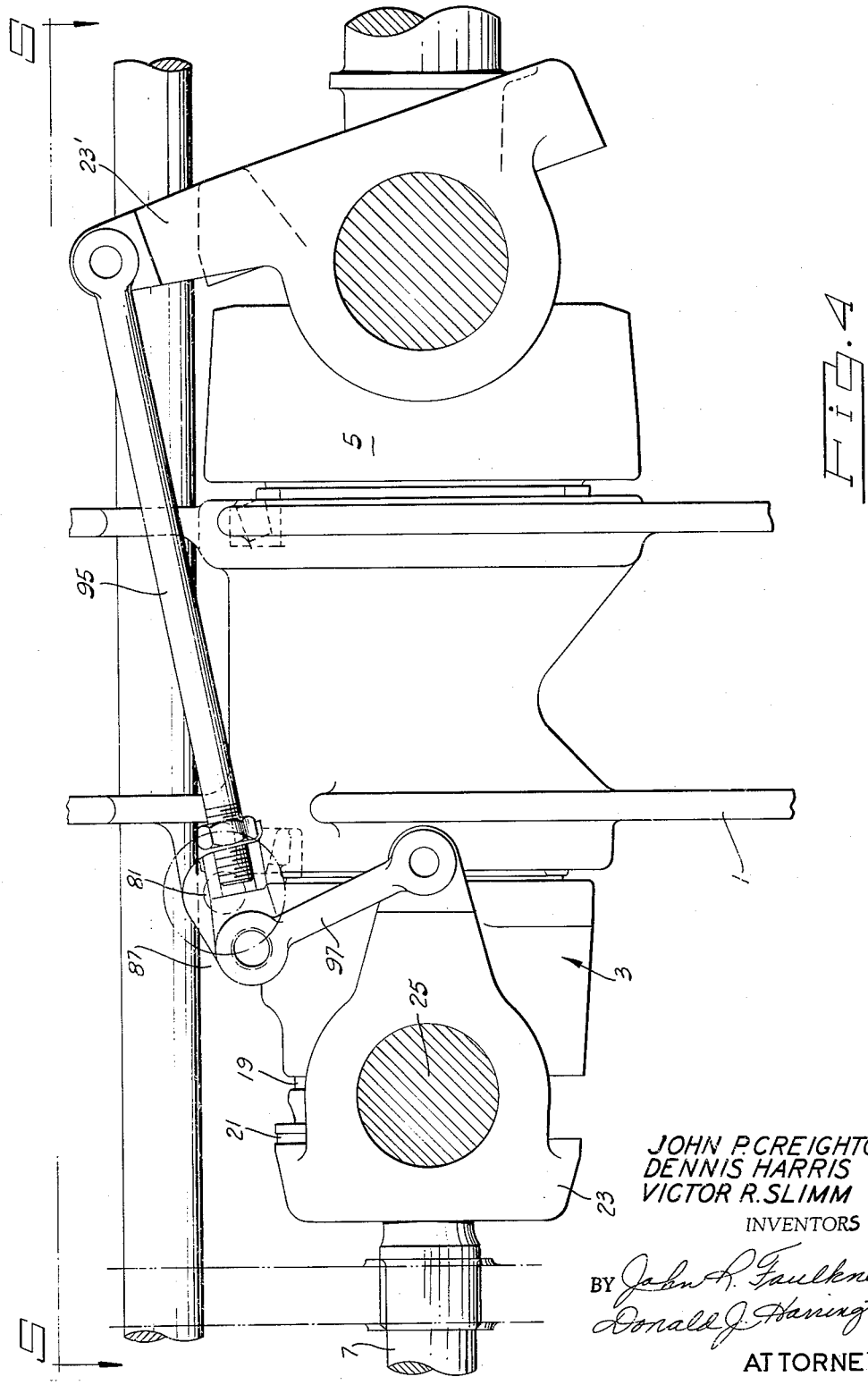

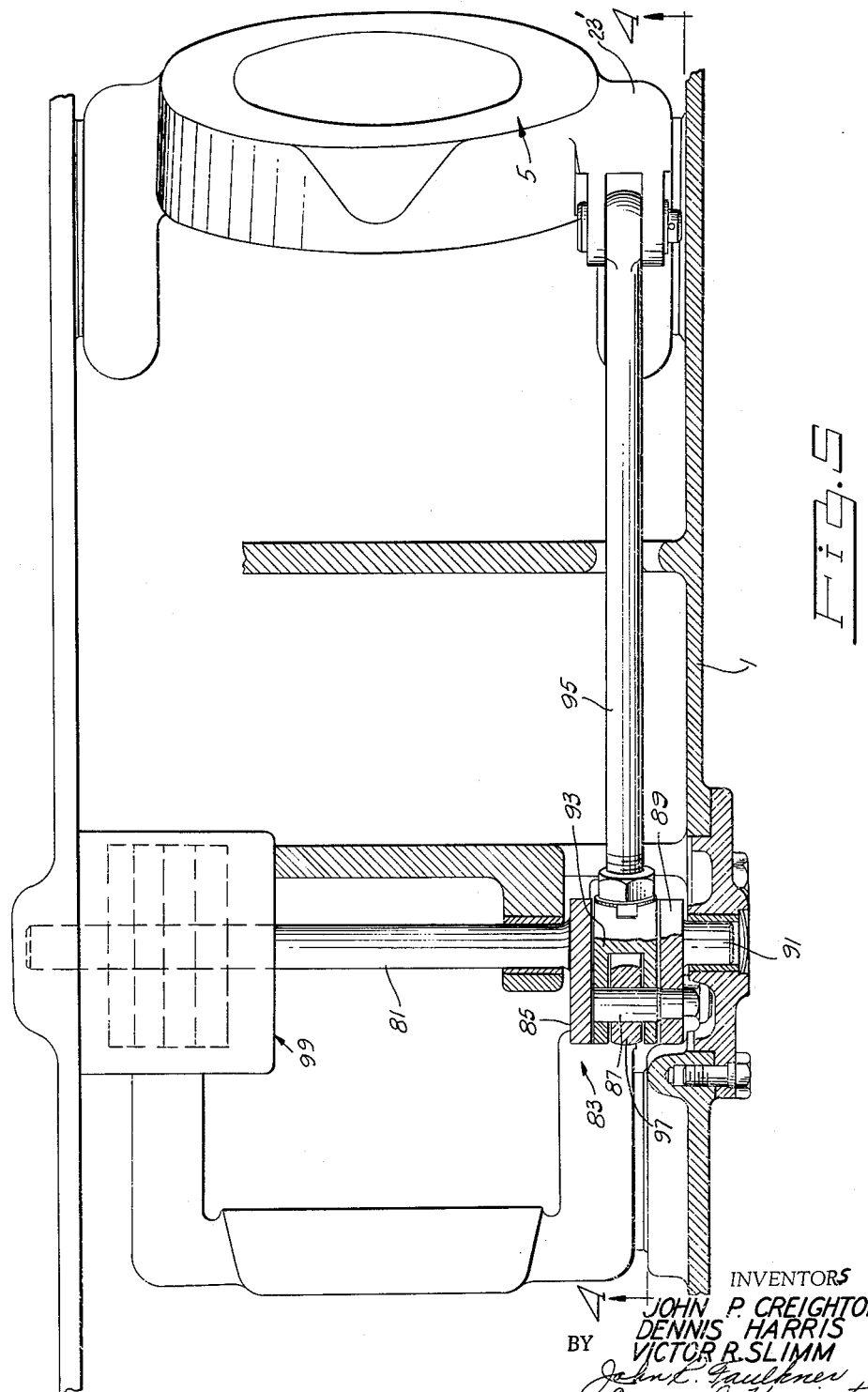

United States Patent Office 3,213,619
Patented Oct. 26, 1965

3,213,619
HYDROSTATIC TRANSMISSION
John P. Creighton, Shirley Solihull, Dennis Harris, Birmingham, and Victor Ray Slimm, Winchcombe, England, assignors to Ford Motor Company, Dearborn, Mich., a corporation of Delaware
Filed Apr. 22, 1964, Ser. No. 361,858
4 Claims. (Cl. 60—53)

This invention relates generally to axially movable piston type hydrostatic units in the form of pumps and motors and to transmissions that embody them in a torque transmitting system. More particularly, this invention relates to improvements in hydrostatic power transmission mechanisms employing variable displacement hydrostatic units with adjustable swashplates for varying the fluid displacement of the units.

Hydrostatic pumps used in environments of this type normally are provided with a distributor valve in the form of a valve plate disposed in sliding and sealing relationship with respect to a pump body or rotor. Fluid displacement pistons are received within axially disposed cylinders in the pump body. The valve plate controls distribution of fluid toward and away from the cylinders of the pump as the pump body rotates relative to the valve plate. The cylinders within which the pistons move inwardly are interconnected by means of a high pressure port in the valve plate, and the cylinders within which the pistons move outwardly are interconnected by a low pressure port in the valve plate. In a valve arrangement of the simplest form, the high pressure port and the low pressure port are separated by arcs at both a top dead center position (the position of the pump body corresponding to the outermost position of a piston within its cylinder) and the bottom dead center position (the position of the pump body corresponding to the innermost piston position), the arcs being substantially equal to the diameter of a cylinder. Consequently, as each cylinder moves so that it is cut off from communication with one port and put into communication with the other port there is an abrupt change of pressure in the cylinder. This pressure change has two effects. In the first place, it causes an abrupt change in the force moments acting upon the swashplate. Secondly, it causes fluid to flow between any given cylinder and the port within which a cylinder comes into communication upon rotation of the pump body. This latter effect causes noise and a power loss which, by preference, is designated as "wave energy loss."

It is an object of the invention to reduce the adverse effects due to such changes in swashplate moments and to reduce the so-called "wave enegry loss" in an environment of this type.

In an effort to reduce wave energy loss and noise it sometimes is desirable to increase the length of the arc separating the high and low pressure ports in such a way that after a cylinder has passed the top dead center position it is not put into communication with the high pressure port until the piston of the cylinder has moved inwardly to compress the fluid to a pressure approximately equal to the magnitude of the pressure in the high pressure port. After that cylinder has passed the bottom dead center position it is not put into communication with a low pressure port until the piston has moved outwardly to reduce the fluid pressure to a value approximately equal to the magnitude of the pressure in a low pressure port. This expedient reduces the noise and the wave energy losses, but it does not significantly modify the abrupt changes in swashplate moments. Such abrupt changes in moments make it necessary to use heavy control system components that are cumbersome, expensive and prone to failure. The provision of a hydrostatic unit having a valve plate arrangement that will eliminate these disadvantages is another object of my invention.

In axial piston swashplate type motors used in an environment of this type there normally is provided a distributor valve corresponding to the pump distributor valve. It is known practice to reduce the wave energy loss and noise in such motors by pre-expansion and pre-compression produced solely by piston movement when a cylinder is not in communication with either a high pressure port or a low pressure port. This takes place, of course, before a cylinder reaches the dead center position rather than after it has passed the dead center position as in the case of a pump.

It is an object of this invention, therefore, to reduce the abrupt changes in swashplate moments by pre-compression of an expanding column of fluid and pre-expansion of a contracting column of fluid in each cylinder as the cylinder passes between the high and low pressure ports.

In a pump embodying the features of this invention there is relative rotation between the distributor valve and the cylinder barrel. The high and low pressure ports in the distributor valve are spaced apart by arcs extending across the top and bottom dead center positions, each arc being larger than the diameter of a cylinder. The ends of the ports are so located that each cylinder is cut off from communication with the port with which it has just been in communication before the cylinder axis reaches the adjacent dead center position. At that instant a passage is put into communication with the cylinder before it reaches the dead center position. That passage is connected to a modified pressure region of the unit so that the pressure change in the cylinder produced by movement of the piston as the dead center position is approached is more than offset by the pressure transmitted through the passage.

In a motor embodying the features of this invention there again is relative rotation between the distributor valve and the cylinder barrel. The high and low pressure ports in the distributor valve are spaced apart by arcs extending across the top and bottom dead center positions, each arc being longer than the diameter of a cylinder. The ends of the ports are so located that each cylinder is not put into communication with the port with which it is about to be put into communication until the cylinder has passed the adjacent dead center position. Unlike a pump, a passage is put into communication with each cylinder after it passes each dead center position and that passage is connected to a source of modified pressure so that the pressure change in the cylinder produced by movement of the piston after the dead center position has been passed is more than offset by the pressure transmitted through the passage.

Preferably, in the pump, the passage is put into communication with each cylinder so that the pressure in the cylinder begins to differ from that in the port with which it has been in communication at $\pi/2n$ radians in advance of the dead center position where $n$ is the number of cylinders. In the motor, however, the pressure in each passage more than offsets the pressure change in each cylinder produced by movement of the piston over an arc of $\pi/2n$ radians beyond each dead center position, where $n$ is the number of cylinders.

Advantageously, in the pump or motor or in both the passages, ports and pressures are such that the pressure in each cylinder between the high and low pressure ports changes approximately linearly over an arc of $\pi/n$ radians where $n$ is the number of cylinders. Furthermore, the pressure in each cylinder at each dead center position is $$\frac{H+L}{2}$$

where H is the pressure in the high pressure port and L is the pressure in the low pressure port.

Since the swashplate moments are significantly reduced, the control system for a transmission comprising a pump and motor may be simplified, reduced in size and made more reliable. The provision of a control system of this type is another object of this invention.

A control system according to this invention is adapted, when changing from a low speed ratio to a high speed ratio, to tilt first the pump swashplate from a neutral position approximately perpendicular to the cylinder axes to a tilted position inclined to the cylinder axes. It then tilts the motor swashplate from a tilted position to a position nearer the perpendicular for the cylinder axes. The system comprises a rotatable control element, a pump link connecting the element to the pump swashplate and a motor link connecting the element to the motor swashplate, the axes of the links intersecting at a large angle so that rotation of the element through an initial angle when changing from a low speed ratio to a high speed ratio moves the pump link longitudinally through a considerably greater distance than the motor link to tilt the pump swashplate without significantly affecting the inclination of the motor swashplate. Further rotation of the element moves the motor link through a considerably greater distance than the pump link to reduce the tilt of the motor swashplate without significantly affecting the tilt of the pump swashplate. The provision of a linkage system having these characteristics is another object of this invention.

Preferably, the links and the control element are so arranged that rotation of the element through an initial angle causes the motor link to pass over center in relation to its connection to the element whereby movement of the element to tilt the pump swashplate tilts the motor swashplate through a small angle in one direction and then through a small angle in the opposite direction.

The control element is rotatable also to a reverse drive position in which the tilt of the motor swashplate follows the same sequence as for forward drive as the pump swashplate is tilted in a direction opposite to that for forward drive to effect reverse drive. The provision of a linkage system having this mode of operation is another object of this invention.

The control element may be a crank, and the links are connected to the web portions of the crank.

The invention is hereinafter particularly described with reference to the accompanying drawings in which:

FIG. 2 is a diagrammatic plan view of the pump distributor valve;

FIG. 3 is a diagrammatic plan view of the motor distributor valve;

FIG. 4 is a side elevation of a control system for the transmission, and

FIG. 5 is a plan view of the control system.

Figure 1:
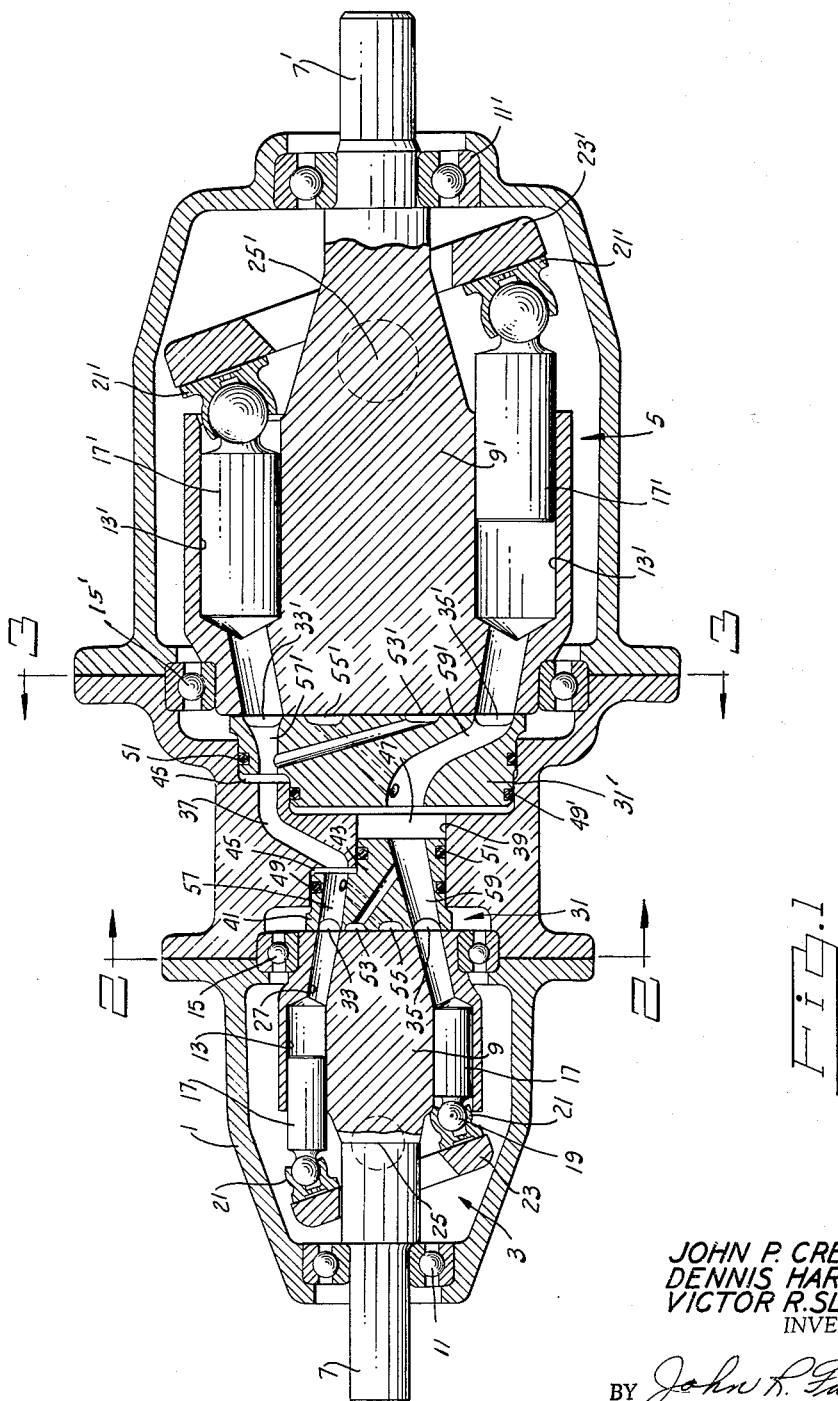
FIG. 1 is an axial section through a hydrostatic transmission according to the invention.

The transmission, which is housed in a casing 1, comprises a pump 3 and a motor 5. The pump 3 comprises a drive shaft 7 which is connected to a cylinder barrel 9. Bearings 11 rotatably support shaft 7. The cylinder barrel contains a number of cylinders 13 spaced uniformly around the axis of the shaft 7. It is rotatably supported in the casing 1 by bearings 15. Pistons or plungers 17 are slidably situated in the cylinders 13 and have ball ends 19 which fit into shoes 21. The shoes 21 bear against and are slidable relative to a swashplate 23 which is mounted in the casing 1 for tilting movement about an axis 25 transverse to the axis of the drive shaft 7. The cylinders 13 each communicate with passages 57 which terminate in the end face of the cylinder barrel 9.

When the drive shaft 7 is rotated, the cylinder barrel 9 and the pistons 17 also are rotated. The swashplate 23 is not rotated, however, since it is mounted in the casing 1. Therefore, when the swashplate is inclined as shown in FIG. 1, rotation of the cylinder barrel 9 causes reciprocation of the pistons 17 in the cylinders 13. This reciprocation causes the pistons that are being rotated towards the top dead center position (i.e., towards the part of the swashplate 23 farthest from the end face of the cylinder barrel 9) to draw oil into the respective cylinders, and the pistons that are being rotated away from the top dead center position and towards the bottom dead center position to pump oil out of the cylinders 13. The oil that is being drawn into and pumped out of the cylinders 13 flows through the passages 27. The volume of oil pumped clearly depends upon the angle of tilt of the swashplate 23, the larger the angle of tilt the greater the quantity of oil pumped for each revolution.

A floating distributor valve 31 abuts the end face of the cylinder barrel 9 and is non-rotatably mounted in the casing 1. The valve 31 has a low pressure port 33 (FIGS. 1 and 2) and a high pressure port 35 which are connected through passages 57 and 59, respectively, to passages 37 and 39 in the casing 1. The valve 31 is formed with two non-aligned cylindrical parts 41 and 43, which are axially slidable in correspondingly shaped parts of the casing 1. Between each of the parts 41 and 43 and the casing 1 there are pressure chambers 45 and 47, respectively. The passage 37 terminates in the chamber 45 while the passage 39 constitutes the chamber 47. The pressure chambers 45 and 47 are sealed from each other by O-rings 49 and 51 which not only provide a seal but also permit axial movement and a small amount of universal movement of the valve 31.

In addition to the high and low pressure ports 33 and 35, the valve 31 has a pair of blind ports 53 and 55 which communicate with the passages 57 and 59. The engaging faces of the cylinder barrel 9 and valve 31, in operation, are urged away from each other by the oil between the valve and cylinders 13. The pressure of the oil in the pressure chambers 45 and 47, however, forces the valve towards the end of the cylinder barrel and so holds the valve in engagement with the end face of the cylinder barrel. The blind ports 53 and 55 are so located and arranged that the center of pressure between the cylinder barrel face and valve 31 and between the valve 31 and the casing 1 are in approximate alignment so as to reduce the tendency of the valve to wobble. The pump shown in the drawings is designed to be rotated in one direction shown in FIG. 2, and the swashplate 25 is designed to be tilted in either direction from the neutral position in which it is perpendicular to the axis of the drive shaft 7. Thus in the pump shown in the drawings, the port 35 is a high pressure port for forward direction of travel and the port 33 is a high pressure port for reverse direction of travel.

The shapes of the various ports in the valve 31 are shown in FIG. 2 in which the top dead center position is indicated by the legend T.D.C., the bottom dead center position by the legend B.D.C., and the axis 25 of the swashplate by the line X—X. As can be seen from FIG. 2, the ports are not symmetrically arranged. The end of the low pressure port 33 that terminates adjacent the T.D.C. position is spaced from the latter position by an arc whose length is greater than the diameter of the cylinders 13. The end of the high pressure port that terminates adjacent the B.D.C. position is spaced from the latter position by an arc whose length is greater than the diameter of a cylinder 13. The end of the high pressure port proper and low pressure port proper adjacent the T.D.C. and B.D.C. positions, respectively, are spaced from the latter positions by arcs larger than the diameter of a cylinder 13.

Thus, as the cylinder barrel 9 is rotated to move a cylinder 13 clear of the low pressure port 33, the piston in the latter cylinder is still moving outwardly in the cylinder 13 until it reaches the T.D.C. position to try to draw more oil into the cylinder. However, just after the cylinder is moved clear of the low pressure port 33, it moves into communication with a passage 63 connected to the high pressure blind port 59. The pressure transmitted through this passage 63 to the cylinder increases the pressure in the cylinder despite the outward movement of the piston 17.

As the cylinder moves beyond the T.D.C. position, the cylinder is cut off from communication with the passage 63. But the piston 17 is then moving inwardly in the cylinder, and this, since the cylinder is not put into communication with the high pressure port 35 until the cylinder has moved past the T.D.C. position, causes the pressure in the cylinder to increase progressively (pre-compression).

Adjacent the B.D.C. position there is a similar condition. A piston 17 in a cylinder, as the latter moves clear of the high pressure port 35, is still moving inwardly to try to force oil out of the cylinder into the high pressure chamber 47. This it cannot do, and so the movement of the piston, as the cylinder approaches the B.D.C. position, tends to increase the pressure in the cylinder. However, after the cylinder has moved clear of the high pressure port, it is put into communication with a passage 65 connected to the low pressure blind port 55. The lower pressure existing in this passage permits a decrease in pressure despite the inward movement of the piston.

As each cylinder moves beyond the B.D.C. position it is cut off from communication with the passage 65. However, the outward movement of the piston in the cylinder, before the latter reaches the low pressure port, further reduces the pressure in the cylinder (pre-expansion).

A passage 67 extends from the high pressure port adjacent the T.D.C. position and another passage 69 extends from the low pressure port adjacent the B.D.C. position. These passages help to provide a uniform pressure change in the cylinders as the latter move between the T.D.C. and B.D.C. positions.

The passages 63, 65, 67 and 69, the high and low pressure ports 33 and 35 and the pressure in the passages are so arranged that the pressure in each cylinder between the high and low pressure ports 33 and 35 changes approximately linearly over an arc of $\pi/n$ radians, where $n$ is the number of cylinders, and the pressure in each cylinder at each dead center position is $$\frac{H+L}{2}$$

where H is the pressure in the high pressure port and L is the pressure in the low pressure port.

The motor 5 is structurally almost identical with the pump 3, and the same reference numerals are used for similar parts although prime notations have been added.

The motor swashplate 23' is tiltable on only one side of the perpendicular to the axis of the driven shaft 7', forward and reverse drive being controlled by the direction of tilt of the pump swashplate. This means that ports and passages in the motor valve must be symmetrical about the T.D.C.-B.D.C. axis, and this in turn precludes the use of the port arrangement used for the pump and described with reference to FIG. 2.

In the motor the cylinders are in communication with the high pressure port 35' when the pistons are moving outwardly in the cylinders (increasing length of column of oil), whereas in the pump the cylinders are in communication with the high pressure port 35' when the pistons are moving inwardly in the cylinders. Thus, after a cylinder 13' ceases to be in communication with the high pressure port 35' and before it reaches the B.D.C. position, the movement of each piston in its cylinder tends to reduce the pressure in the cylinder. However, after each cylinder has passed the B.D.C. position, its piston moves inwardly in the cylinder and tends to increase the pressure in the cylinder. This occurs as the cylinder is about to be put into communication with the low pressure port 33. At the T.D.C. position, the movement of the piston in each cylinder, when the latter moves towards the T.D.C. position and ceases to be in communication with the low pressure port, tends to increase the pressure in the cylinder. When the cylinder has passed beyond the T.D.C. position, the pressure in the cylinder tends to decrease as the cylinder approaches the high pressure port.

Thus, in the motor the piston movement tends to produce a pressure change in the cylinder opposite to that required after a dead center position is reached as opposed to the pump in which the piston movement tends to produce a pressure change opposite to that required before the dead center position is reached.

Each cylinder of the motor thus is put into communication with a passage after it has passed a dead center position, and the pressure transmitted through this passage more than offsets its pressure change produced by movement of the piston.

Since the motor is reversible, a symmetrical passage and port arrangement is required. This makes it necessary for each cylinder to be connected to a passage 73 or 75 both before and after each dead center position is reached. The passages 73 and 75 are T-shaped, the arm 77 of each T being an arc extending across the radius passing through the dead center positions and the leg 79 of each T being located on the radius. The leg 79 of the passage 73 at the T.D.C. position is connected to an independent high pressure source, while the leg 79 of the passage 75 is connected to the sump of the casing 1 which is, of course, at atmospheric pressure. As in the pump, the passages 73 and 75, the ports 33' and 35' and pressure in the passages 73 and 75 are such that the pressure in each cylinder between the high and low pressure ports changes approximately linearly over an arc of $\pi/n$ radians, where $n$ is the number of cylinders and the pressure in each cylinder at each dead center position is $$\frac{H+L}{2}$$

where H is the pressure in the high pressure port and L is the pressure (i.e., atmospheric) in the lower pressure port.

As mentioned before, the port arrangement in the distributor valve reduces very considerably the magnitude of the tilting moments on the swashplate. This reduction in the moments not only reduces the likelihood of failure in the control system for tilting the swashplate but also enables a simpler and less expensive control system to be used. The control system is such that to change from a low speed ratio to a high speed ratio, the angle of tilt of the pump swashplate is increased without significantly affecting the tilt of the motor swashplate. After the pump swashplate has been tilted to a maximum extent, the tilt of the motor swashplate is reduced without significantly affecting the tilt of the pump swashplate. To change from a high speed ratio to a low speed ratio, the sequence of operations is reversed. The control system according to this invention is shown in FIGS. 4 and 5.

A rotatable rod 81 is journalled in the casing 1 and at its end there is a crank 83. One arm 85 and the pin 87 of the crank are integral with the rod 81, while the other arm 89 of the crank is screwed onto the threaded end of the pin 87. Arm 89 has a boss 91 journalled in the casing. The arms of a U-shaped member 93 are pivotally mounted on the pin 87, and into the base of the member one end of a motor link 95 is screwed. The opposite end of the link 95 is pivotally connected to the motor swashplate 23. One end of a pump link 97 is pivotally mounted on the pin 87 between the arms of the U-shaped member 93, and the opposite end of the link is pivotally connected to the pump swashplate 23.

The rod 81 is rotatable by means of a servo motor diagrammatically indicated at 99 in FIG. 4. The servo motor is such that, if it should fail, the rod 81 is manually rotatable. The axes of the links 95 and 97 intersect at a large angle, as can be seen from FIG. 5.

In FIG. 5 the control system is shown in the position in which the transmission is in neutral. When the rod 81 is initially rotated clockwise from the FIG. 5 position, the major component of the consequent initial crank movement is away from the axis of the drive shaft 7 and, since the pump link 97 makes a large angle with the latter axis, this results in the pump link being moved longitudinally to tilt the pump swashplate 23 to increase the speed ratio. The major component of the initial crank movement, however, is transverse to the axis of the motor link 95 with the result that the angle of tilt of the motor swashplate is not affected significantly. The effect of the small change in the angle of the tilt of the motor swashplate is minimized by the motor link 95 passing over center in relation to its connection to the crank 83 so that, in fact, the motor swashplate is first tilted through a small angle in one direction and then through a small angle in the opposite direction during the initial clockwise rotation of the rod 81.

After the rod 81 has been rotated through a substantial angle and the pump swashplate is near its position of maximum tilt, the major component of movement of the crank 83 is parallel to the axis of the shaft 7 and consequently transverse to the pump link 97 and parallel to the motor link 95 with the result that there is little longitudinal movement of the pump link. The pump link is merely rocked but the motor link 95 undergoes substantial longitudinal movement. This results in little further tilting of the pump swashplate and tilting of the motor swashplate to a position nearer the perpendicular to the axis of the shaft 7.

Anti-clockwise rotation of the rod 81 from this neutral position results in a similar sequence of operations as described above except that the tilt of the pump swashplate is such as to produce reverse drive.

The port arrangement shown in FIG. 3 for the motor valve may be used, of course, for the pump. Also, the port arrangement shown in FIG. 2 for pump valve may be used for the motor if the motor is not reversible.

What I claim and desire to secure by United States Letters Patent is:

1. In a hydrostatic unit having a body mounted for rotation about a first axis, cylinders in said body arranged on axes parallel to said first axis, a piston in each cylinder cooperating therewith to define a fluid pressure working chamber, a swashplate having a surface disposed at an acute angle with respect to said first axis, said pistons being engageable with said surface and movable within said cylinder upon rotation of said body between a top dead center position and a bottom dead center position, a valve plate engageable with said body, arcuate high and low pressure ports in said valve plate in communication with said working chambers, said ports being spaced apart by arcs extending across the top of bottom dead center positions, each arc being longer than the diameter of a cylinder, a passage extending from one of said ports to a point on a valve plate arc between a location corresponding to a dead center position and the adjacent end of said one port whereby the pressure in said working chambers is changed as the corresponding cylinders pass over said adjacent end of said one pressure port, said pressure changing approximately linearly over approximately $\pi/n$ radians, where $n$ is the number of cylinders, and the pressure in each cylinder at each dead center position being $$\frac{H+L}{2}$$

where H is the pressure in the high pressure port and L is the pressure in the low pressure port.

2. In a hydrostatic motor having a body mounted for rotation about a first axis, cylinders in said body arranged on axes parallel to said first axis, a piston in each cylinder and cooperating within to define a low pressure working chamber, a swashplate having a surface disposed at an acute angle with respect to said first axis, said pistons being engageable with said swashplate surface and movable within said cylinder upon rotation of said body between a top dead center position and a bottom dead center position, a valve plate engageable with said body, arcuate high and low pressure ports in said valve plate in communication with said working chambers, said ports being spaced apart by arcs extending across the top and bottom dead center positions, each arc being longer than the diameter of a cylinder, a passage extending from a low pressure region of said unit to a point on one valve plate arc between a location corresponding to the bottom dead center position and the adjacent end of said high pressure port whereby the working chambers are depressurized as the corresponding cylinders pass over said bottom dead center position and approach the adjacent edge of said high pressure port, the pressure in each cylinder as it passes over each arc changing approximately linearly over approximately $\pi/n$ radians, where $n$ is the number of cylinders, the pressure in each cylinder at each dead center position being $$\frac{H+L}{2}$$

where H is the pressure in the high pressure port and L is the pressure in the low pressure port.

3. In a hydrostatic power transmission mechanism a hydrostatic motor and a hydrostatic pump situated in a closed hydrostatic circuit to define a power delivery path, said motor and said pump being adapted for rotation about their respective axes, pumping elements carried by said pump and said motor and adapted for axial displacement, separate swashplates for said pump and motor for controlling the displacement of said pumping elements, each swashplate being adjustable about an axis transverse to the axes of said pump and motor, a control linkage system comprising a rotatable control element, a pump link connecting said control element to the motor swashplate and a motor link connecting the control element to the motor swashplate, the axes of the links intersecting a large angle so that rotation of said control element through an initial range of angular movement when changing from a low speed ratio to a high speed ratio moves the pump link longitudinally through a considerably greater distance than the motor link to tilt the pump swashplate without significantly affecting the inclination of the motor swashplate, and wherein further rotation of the control element through a subsequent range of angular travel moves the motor link longitudinally through a considerably greater distance than the pump link to reduce the tilt of the motor swashplate without significantly affecting the tilt of the motor swashplate.

4. In a hydrostatic power transmission mechanism a hydrostatic motor and a hydrostatic pump situated in a closed hydrostatic circuit to define a power delivery path, said motor and said pump being adapted for rotation about their respective axes, pumping elements carried by said pump and said motor and adapted for axial displacement, separate swashplates for said pump and motor for controlling the displacement of said pumping elements, said each swashplate being adjustable about an axis transverse to the axes of said pump and motor, a control linkage system comprising a rotatable control element, a pump link connecting said control element to the motor swashplate and a motor link connecting the control element to the motor swashplate, the axes of the links intersecting at a large angle so that rotation of said control element through an initial range of angular movement when changing from a low speed ratio to a high speed ratio moves the pump link longitudinally through a considerably greater distance than the motor link to tilt the pump swashplate without significantly affecting the inclination of the motor swashplate, and wherein further rotation of the control element through a subsequent range of angular travel moves the motor link longitudinally through a considerably greater distance than the pump link to reduce the tilt of the motor swashplate without significantly affecting the tilt of the motor swashplate, said element being rotatable in the opposite direction to a reverse position in which the tilt of the motor swashplate follows the same sequence as during forward drive or the pump is tilted in a direction opposite to that for forward drive to effect reverse drive.

References Cited by the Examiner
UNITED STATES PATENTS 2,619,041  11/52  Born _____ 60—53 X SAMUEL LEVINE, *Primary Examiner.*

EDGAR W. GEOGHEGAN, *Examiner.*